United States Patent

Nishio et al.

Patent Number: 5,159,018
Date of Patent: Oct. 27, 1992

[54] THERMOPLASTIC RESIN COMPOSITION

[75] Inventors: Taichi Nishio; Takashi Sanada; Takayuki Okada, all of Chiba, Japan

[73] Assignee: Sumitomo Chemical Co., Ltd., Osaka, Japan

[21] Appl. No.: 638,765

[22] Filed: Jan. 8, 1991

Related U.S. Application Data

[63] Continuation of Ser. No. 113,472, Oct. 28, 1987, abandoned.

[30] Foreign Application Priority Data

Oct. 31, 1986 [JP] Japan .................................. 61-260986

[51] Int. Cl.$^5$ ............................................. C08L 71/12
[52] U.S. Cl. ...................................... 525/132; 525/68; 525/92; 525/133; 525/390; 525/391; 525/392; 525/396; 525/397; 525/905
[58] Field of Search ................. 525/68, 396, 397, 905, 525/132, 391, 392, 92, 133

[56] References Cited

U.S. PATENT DOCUMENTS 4,873,276  10/1989  Fujii et al. .

FOREIGN PATENT DOCUMENTS 237187  9/1987  European Pat. Off. .
262901  4/1988  European Pat. Off. .

OTHER PUBLICATIONS

WO87/05304, Sep. 11, 1987; Fujii et al.

Primary Examiner—Jacob Ziegler
Attorney, Agent, or Firm—Cushman, Darby & Cushman

[57] ABSTRACT

A novel thermoplastic resin composition excellent in both mechanical properties and processability is provided which comprises (A) 100 parts by weight of a composition comprising (a) 5-95% by weight of a polyamide having a relative viscosity of 1.6-3.3 and content of end amine group of 35-95 mmole/kg and (b) 95-5% by weight of a polyphenylene ether obtained by oxidation polymerization of at least one phenol compound represented by the formula:

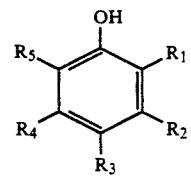

wherein $R_1$, $R_2$, $R_3$, $R_4$ and $R_5$ which may be identical or different and represent a hydrogen atom, a halogen atom or a substituted or unsubstituted hydrocarbon residue, with a proviso that at least one of them is a hydrogen atom and (B) 0.01-100 parts by weight of at least one mutual compatibilizer. The compatibilizer may be a modified rubber-like material and/or an epoxy compound.

7 Claims, No Drawings

THERMOPLASTIC RESIN COMPOSITION

This is a continuation of application Ser. No. 07/113,472, filed Oct. 28, 1987 now abandoned.

This invention relates to a resin composition which comprises a polyphenylene ether and a polyamide.

More particularly, it relates to a novel thermoplastic resin composition which comprises a polyphenylene ether and a polyamide wherein relative viscosity of the polyamide is specified and a mutual compatibilizer is used in combination and this composition is excellent in fluidity, mechanical properties and processability. This composition can be made into shaped articles, sheets, films, etc. by injection molding, extrusion molding, etc.

Polyphenylene ether is a thermoplastic resin superior in various mechanical properties, heat resistance, electrical properties, chemical resistance, hot water resistance, flame resistance and dimension stability, but inferior in processability due to high melt viscosity and relatively inferior in impact resistance.

A composite material comprising polyphenylene ether and polystyrene is proposed in order to lessen melt viscosity of polyphenylene ether and to improve processability thereof, leaving various other good properties of polyphenylene ether unchanged. However, such inherent good properties of polyphenylene ether as heat resistance, flame resistance and chemical resistance are somewhat damaged when enough polystyrene is added to provide practical processability. No sufficient improvement is seen in impact resistance, either, even after polystyrene is added.

On the other hand, polyamide is a thermoplastic resin characterized by its heat resistance, stiffness, strength, oil resistance, etc., but inferior in processability and impact resistance and high in water absorption and exhibit great changes in the properties and dimension for practical use. Thus, further improvements have been desired.

Development is expected in new applications if a resin composition is prepared in which polyphenylene ether and a polyamide are blended, maintaining favorite properties of both components and having improved processability and impact strength. However, polyphenylene ether and polyamide differ in melt viscosity and are very poor in compatibility. Simple blending of the two components encounters the following difficulties:

1. hardness in stable take-up of strands extruded and greatly lower processability in molding, because their melt viscosity difference is very large; and
2. no improvement in mechanical properties of the shaped articles, particularly in impact resistance, but rather lower than expected on the basis of their respective values.

One approach to solve these problems is addition of additives having reactivity or compatibility to system of polyphenylene ether and polyamide as disclosed in Japanese Patent Publication (Kokoku) No. 60 - 11966 and Japanese Patent Publication (Kokai) Nos. 56 - 47432, 57 - 10642 and 60 - 58463. Especially, the methods disclosed in Japanese Patent Publication (Kokoku) No. 60 - 11966 and Japanese Patent Publication (Kokai) No. 56 - 47432 afford good effect, but impact strength is still not enough.

Furthermore, Japanese Patent Publication (Kokai) Nos. 56 - 49753, 57 - 10642, 57 - 165448 and 59 - 66452 disclose the use of reactive additives with modified polystyrene, polyphenylene ether or rubber. Such composition is out of balance between impact resistance and heat resistance and besides improvement of impact resistance is still not sufficient.

As a result of the inventors' intensive research on improvements in resin compositions comprising a polyphenylene ether and a polyamide, it has been found that resin compositions superior in mechanical properties and processability is obtained by specifying the relative viscosity of the polyamide as 1.6-3.3 and content of the end amine group thereof as 35-95 mmole/kg and further using a mutual compatibilizer in combination.

That is, this invention relates to a thermoplastic resin composition which comprises (A) 100 parts by weight of a composition comprising (a) 5-95 % by weight of a polyamide having a relative viscosity of 1.6-3.3 and content of the end amine group of 35-95 mmole/kg and (b) 95-5 % by weight of a polyphenylene ether obtained by oxidation polymerization of at least one phenol compound represented by the formula:

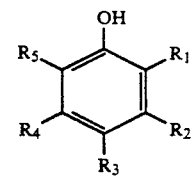

wherein $R_1$, $R_2$, $R_3$, $R_4$ and $R_5$ which may be identical or different and represent a hydrogen atom, a halogen atom or a substituted or unsubstituted hydrocarbon residue, with a proviso that at least one of them is a hydrogen atom and (B) 0.01-100 parts by weight of at least one mutual compatibilizer.

As the polyamides (a) which is one component of composition (A) there may be used those obtained by polycondensation of lactams of three or more membered rings, polymerizable $\omega$-amino acids, dibasic acids with diamines, etc. As typical examples thereof, mention may be made of polymers of $\epsilon$-caprolactam, aminocaproic acid, enantholactam, 7-aminoheptanoic acid, 11-aminoundecanoic acid, etc., polymers obtained by polycondensation of diamines such as hexamethylenediamine, nonamethylenediamine, undecamethylenediamine, dodecamethylenediamine, m-xylylenediamine, etc. with dicarboxylic acids such as terephthalic acid, isophthalic acid, adipic acid, sebacic acid, dibasic dodecanoic acid, glutaric acid, etc., or copolymers thereof.

Typical examples of said polyamides are aliphatic polyamides such as polyamide 6, polyamide 6,6, polyamide 6,10, polyamide 11, polyamide 12, polyamide 6,12, etc. and aromatic polyamides such as polyhexamethylenediamine terephthalamide, polyhexamethylenediamine isophthalamide, xylene group-containing polyamides, etc. These may also be used as mixtures or copolymers of two or more of them.

Relative viscosity of the polyamide (a) is specified within the range of 1.6-3.3 (JIS K 6810, sulfuric acid solution method). More preferred range is 2.0-3.1. When the relative viscosity is less than 1.6, mechanical properties are markedly deteriorated. When it is more than 3.3, fluidity and impact resistance are deteriorated.

Content of the end amine group should be 35-95 mmole/kg. When the content is less than 35 mmole/kg, little improvement in physical properties such as impact strength is seen, since a reaction with the compatibilizer is not enough. When the content is greater than 95 mmole/kg, flowability is degraded.

Polyphenylene ether for (b) which is another component of (A) is a polymer obtained, for example, by oxidation polymerization of one or more of phenol compounds having the formula:

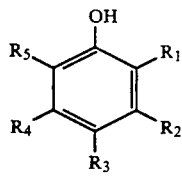

wherein $R_1$, $R_2$, $R_3$, $R_4$ and $R_5$ which may be identical or different and represent a hydrogen atom, a halogen atom or a hydrocarbon residue substituted or not and at least one of them is a hydrogen atom, with molecular oxygen or gas containing the same in the presence of an oxidation coupling catalyst.

Examples of $R_1$–$R_5$ are a hydrogen atom, halogen atoms such as a chlorine atom, a bromine atom, a fluorine atom and an iodine atom, substituted or unsubstituted hydrocarbon residues of 1–18 carbon atoms, for example, alkyl groups or substituted alkyl groups such as a methyl group, an ethyl group, an n-or iso-propyl group, a pri.-, sec.- or tert.-butyl group, a chloroethyl group, a hydroxyethyl group, a phenylethyl group, a hydroxymethyl group, a carboxyethyl group, a methoxycarbonylethyl group, a cyanoethyl group, aryl or substituted aryl groups such as a phenyl group, a chlorophenyl group, a methylphenyl group, a dimethylphenyl group, an ethylphenyl group, a benzyl group or an allyl group.

Examples of phenol compound are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6-or 2,4,6-trimethylphenol, 3-methyl-6-t. butylphenol, thymol and 2-methyl-6-allylphenol. Alternatively, copolymer of any of the phenol compound listed above and the other phenol compound, for example, polyhydroxy aromatic compound, may be employed. The polyhydroxy aromatic compound is, for example, bisphenol A, tetrabromobisphenol A, resorcin, hydroquinone and novolack resin.

Preferably polymers are homopolymer of 2,6-dimethylphenol or 2,6-diphenylphenol and copolymers of a large amount of 2,6-xylenol and a small amount of 3-methyl-6-t-butylphenol or of 2,3,6-trimethylphenol.

Any oxidation coupling catalyst may be employed for oxidation polymerization of phenol compound, as long as it has polymerization ability. Examples are cuprous compound/tert. amine such as cuprous chloride/triethylamine and cuprous chloride/pyridine; cupric compound/amide/alkali metal hydroxide such as cupric chloride/pyridine/potassium hydroxide; manganese salt/primary amine such as manganese chloride/ethanolamine and manganese acetate/ethylenediamine; manganese salt/alcolate or phenolate such as manganese chloride/sodium methylate and manganese chloride/sodium phenolate; and cobalt salt/tert. amine.

Polymerization temperature for preparing polyphenylene ether is 40° C. or higher (high temperature polymerization) or lower (low temperature polymerization). Either temperature may be used, although polymers produced thereby have different properties.

Polyphenylene ether (b) further includes that grafted with styrenic polymer or other polymer. For instance, grafted one is obtained by graft-polymerizing styrene monomer and/or other comonomer in the presence of polyphenylene ether and organic peroxide (Japanese Patent Publications (Kokoku) 47- 47862, 48 - 12197, 49 - 5623, 52 - 38596 and 52 - 30991) or by melt-kneading polyphenylene ether and polystyrene in the presence of a radical initiator (Japanese Patent Publication (Kokai) 52 - 142799).

Mixing ratio of polyamide (a) and polyphenylene ether (b) in the resin composition (A) is suitably polyamide 5–95% by weight and polyphenylene ether 95–5% by weight. When an amount of polyamide is less than 5% by weight, effects of improvements in solvent resistance and processability are small and when an amount of polyamide is more than 95% by weight, thermal properties such as heat distortion temperature decrease. More preferably, polyamide (a) is 20–90% by weight and polyphenylene ether (b) is 10–80% by weight, further preferably polyamide (a) is 30–80% by weight and polyphenylene ether (b) is 20–70% by weight.

The mutual compatibilizer (B) is such that is compatible or is able to react with the polyphenylene ether (b) and/or polyamide (a) and has a function to stabilize each of the phases and does not cause poor appearance or deterioration of properties due to unstable phases at actual use.

As the mutual compatibilizer, surface active agents of low molecular weight and soaps may also be used, but those of high molecular weight are preferred for obtaining stability of the phases. More preferred are those which can react, even partially, with either one or both of the phases and have not mere affinity therewith, regardless of high molecular weight or low molecular weight. Further preferably, the mutual compatibilizer per se has affinity with or is able to react with (a) and/or (b) and has impact absorbing capacity.

As the mutual compatibilizer of low molecular weight, there may be used at least one compound selected from compounds containing, in the molecule, at least one of carboxyl group, amino group, imino group, epoxy group, amide group, isocyanate group and hydroxyl group or selected from acid anhydrides, carboxylate esters and oxazoline ring containing compounds. Examples of these compounds are aliphatic carboxylic acids, aromatic carboxylic acids, esters, acid anhydrides and acid amides of these acids, imides derived from these acids and/or acid anhydrides, aliphatic glycols or phenols, isocyanates such as toluene diisocyanate and methylenebis-(4-phenyl isocyanate), oxazolines such as 2-vinyl-2-oxazoline, epoxy compounds such as epichlorohydrin and glycidyl methacrylate, aliphatic amines, aliphatic diamines, aliphatic triamines, aliphatic tetramines, aromatic amines such as m-phenylenediamine, 4,4'-methylenedianiline, benzidine, etc. The following unsaturated compounds are more preferred.

Typical examples are maleic anhydride, maleic acid, fumaric acid, maleimide, maleic acid hydrazide, a reaction product of maleic anhydride and diamine, e.g., compounds having the formulas

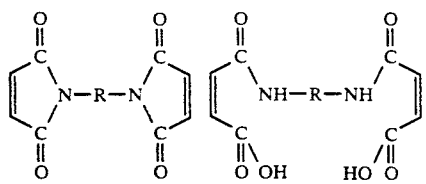

wherein R is an aliphatic or aromatic group, methylnadic anhydride, dichloromaleic anhydride, maleic acid amide and, natural fats and oils such as soybean oil, tung oil, caster oil, linseed oil, hempseed oil, cottonseed oil, sesame oil, rapeseed oil, peanut oil, camellia oil, olive oil, coconut oil and sardine oil; unsaturated carboxylic acid such as acrylic acid, butenoic acid, crotonic acid, vinyl acetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleosteric acid, oleic acid, eicosapentaenic acid, erucic acid, docosadienic acid, docosatrienic acid, docosatetraenic acid, docosapentaenic acid, tetracosenoic acid, hexacosenoic acid, hexacodienoic acid, octacosenoic acid, and tetraaconitic acid; ester, acid amide or anhydride of unsaturated carboxylic acid above; unsaturated oxazoline; unsaturated alcohol such as allyl alcohol, crotyl alcohol, methylvinyl carbinol, allyl carbinol, methylpropenyl carbinol, 4-penten-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohol of the formula: $C_nH_{2n-5}OH$, $C_nH_{2n-7}OH$ or $C_nH_{2n-9}OH$ (n is an integer), 3-butene-1,2-diol, 2,5-dimethyl-3-hexene-2,5-diol, 1,5-hexadiene-3,4-diol or 2,6-octadiene-4,5-diol; and unsaturated amine such as that where an OH group of the unsaturated alcohol is replaced by an —NH$_2$ group.

Isocyanates such as toluene diisocyanate and methylenediphenyl diisocyanate are also included. There may be further included various polymers and rubbers of low molecular weight (e.g., 500–10,000) into which said compatibilizing agents are introduced.

Mutual compatibilizer of high molecular weight includes polymers of high molecular weight (e.g., more than 10,000) into which said compatibilizers of low molecular weight are introduced. Preferred are polyethylene, polypropylene and polyolefin copolymers such as ethylene-propylene copolymer and ethylene-butene copolymer, and above mentioned polyamides, thermoplastic polyesters, and polyphenylene sulfide, polyacetal and polyether ether ketone into which compatibilizing agent of low molecular weight is introduced. These polymers include those copolymerized with other components. Further preferred are the following rubber-like materials and epoxy compounds.

"Modified rubber-like materials" in this invention mean those obtained by modification of rubber-like materials.

"Rubber-like material" in this invention mean natural and synthetic polymer materials which are elastic at room temperature.

As examples of the rubber-like materials, mention may be made of natural rubber, butadiene polymer, butadiene-styrene copolymer (including all of random copolymers, block copolymers, graft copolymers, etc.), isoprene polymer, chlorobutadiene polymers, butadiene-acrylonitrile copolymer, isobutylene polymer, isobutylene-butadiene copolymer, isobutylene-isoprene copolymer, acrylate ester copolymer, ethylene-propylene copolymer, ethylene-butene copolymer, ethylene-propylene-diene copolymer, Thiokol rubber, polysulfide rubber, polyurethane rubber, polyether rubber e.g., polypropylene oxide, epichlorohydrin rubber, polyester elastomer, polyamide elastomer, etc.

These rubber-like materials may be produced by any methods (e.g., emulsion polymerization, solution polymerization, etc.) and with any catalysts (e.g., peroxides, trialkylaluminum, lithium halides, nickel catalysts).

Furthermore, there may also be used those which have various crosslinking degrees, various proportions of micro structures (e.g., cis structure, trans structure, vinyl group, etc.) or various average rubber particle sizes.

Various polymers such as random compolymers, block copolymers, graft copolymers, etc. may be used as the copolymers for rubber-like materials in this invention.

Modification of rubber-like materials may be effected by any methods of introduction of at least one mutual compatibilizer of low molecular weight mentioned above. Generally, this is effected by copolymerization (including all of random copolymerization, block copolymerization, graft copolymerization, etc.) and reaction with main chain, side chain and terminal of molecule.

Epoxy compound includes epoxy resin and precursors thereof and epoxy group-containing copolymer. Examples of epoxy resin and its precursors are bisphenol A epoxy resin, o-cresol novolac epoxy resin, glycidylamine epoxy resin, three-functional epoxy resin and four-functional epoxy resin. The epoxy compound may further contain a reactive diluent.

Epoxy group-containing copolymer includes, for example, unsaturated epoxy compound/ethylenically unsaturated compound copolymer, epoxidized polyester and epoxidized polyamide. Of these copolymers, unsaturated epoxy compound/ethylenically unsaturated compound copolymer is preferred and especially preferred is a copolymer comprising unsaturated epoxy compound, ethylene and ethylenically unsaturated compound excluding ethylene. Unsaturated epoxy compound used for the unsaturated epoxy compound/ethylenically unsaturated compound copolymer has in a molecule both an epoxy group and an unsaturated group which is copolymerizable with the ethylenically unsaturated compound, for instance, unsaturated glycidyl ester and unsaturated glycidyl ether having the formulas (1) and (2) below:

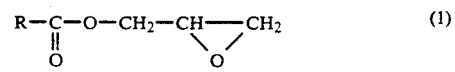

-continued

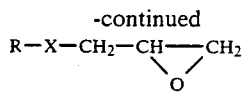 (2)

wherein R is a $C_2$-$C_{18}$ hydrocarbon group containing ethylenically unsaturated bond and X is —$CH_2$—O— or

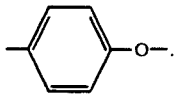

Examples are glycidyl acrylate, glycidyl methacrylate, glycidyl itaconate, allylglycidyl ether, 2-methylallyl glycidyl ether, styrene-p-glycidyl ether. The ethylenically unsaturated compound is olefin, vinyl ester of $C_2$-$C_6$ saturated carboxylic acid, $C_1$-$C_8$ saturated alcohol/acrylic or methacrylic acid ester, maleate, methacrylate, fumarate, halogenated vinyl, styrene, nitrile, vinyl ether or acrylamide. Examples are ethylene, propylene, butene-1, vinyl acetate, methyl acrylate, ethyl acrylate, methyl methacrylate, diethyl malate, diethyl fumarate, vinyl chloride, vinylidene chloride, styrene, acrylonitrile, isobutyl vinyl ether and acrylamide. They are used singly or in a mixture of at least two of them. Ethylene and vinyl acetate are preferable most of all.

Composition ratio of unsaturated epoxy compound and ethylenically unsaturated compound in copolymer is not critical, but 0.1-50% by weight, more preferably 1-30% by weight of unsaturated epoxy compound is preferred.

The epoxy group-containing copolymer is prepared by various methods. Either random copolymerization or graft copolymerization may be effected; in the former, unsaturated epoxy compound is introduced in backbone chain of copolymer, and in the latter, unsaturated epoxy compound is introduced in side chain of copolymer. Examples are copolymerization in which unsaturated epoxy compound is allowed to react with ethylene in the presence of a radical initiator under 500-4000 atm. at 100°-300° C. in the presence or absence of a solvent and a chain transfer agent; graft copolymerization in which polypropylene, unsaturated epoxy compound and a radical initiator are blended and allowed to melt in an extruder; and copolymerization in which unsaturated epoxy compound is allowed to react with ethylenically unsaturated compound in an inert solvent such as water or an organic solvent in the presence of a radical initiator.

An amount of mutual compatibilizer (B) is preferably 0.01-100 parts by weight for 100 parts by weight of the composition comprising polyamide (a) and polyphenylene ether (b). When the amount is less than 0.01 part by weight, compatibilizing effect is low and mechanical properties are not good. When more than 100 parts by weight, heat resistance and fluidity are not good. More preferred amount is 0.1-30 parts by weight, and further preferred amount is 0.1-20 parts by weight.

Preferred embodiments of this invention may be to use the resin composition in the form of reinforced composite materials with reinforcing fibers such as glass fiber, carbon fiber, polyamide fiber and metallic whisker and composite materials with addition of inorganic fillers or flame retardants such as silica, alumina, calcium carbonate, talc, mica, carbon black, $TiO_2$, ZnO and $Sb_2O_3$ and furthermore, lubricants, nuclear agents, plasticizers, dyes, pigments, antistatic agents, antioxidants, weatherability providing agents, etc.

Any process is used to prepare the present resin composition.

Melt-blending methods for the components are the best from an economical point of view, although it is possible to blend the components in a solution and evaporate the solvent or precipitate in a non-solvent. Melt-blending is carried out in a single-screw or a twin-screw extruder, a kneader or so, preferably a high-speed twin-screw extruder.

Before kneading, it is preferable to uniformly blend powder or pellets of the component resins in a tumbler or a Henschel mixer. The first blending above is not always necessary. Alternatively, each resin may be fed to a kneader through a metering apparatus. Resin composition, after kneaded, is molded according to injection, extrusion and the like. Alternatively, dry blending the resin materials at the injection or extrusion molding without prekneading and direct kneading are made in the melt processing to produce a shaped article. Any order is used in the kneading step. For example, compounds for (a) and (b), and (B) are kneaded together, or compounds for (a) and (b) are first kneaded to obtain composition (A) before (B) is kneaded, or a compound for (b) and (B) are first kneaded before a compound for (a) is kneaded. Any other orders can be employed.

The resin composition of this invention is used as shaped articles, sheets, tubes, films, fibers, laminates, coating materials, etc. made by injection molding or extrusion molding, especially as automobile parts such as bumper, inverness, fender, trim, door panel, wheel cover, side protector, garnish, trunk lid, bonnet, roof, etc., interior and exterior materials and mechanical parts required to have heat resistance. Furthermore, the resin composition is used as parts for motor bicycles such as covering material, muffler cover, leg shield, etc. and electrical and electronic parts such as housing, chassis, connector, base for printed circuit, pulley and other parts required to have strength and heat resistance.

This invention is explained referring to examples below, wherein they are merely illustrative ones and this invention is not limited to them. Heat distortion temperature test (H.D.T.), Izod impact strength test (3.2 mm thick), M.I. and relative viscosity are observed in accordance with JIS K 7207, JIS K 7110, JIS K7210 and JIS K 6810 (sulfuric acid method), respectively. Content of end amine group is measured as follows. Sample (0.5 g) is dissolved in m-cresol (20 ml) at 80° C. under a nitrogen atmosphere, to which 0.1 ml of 0.1% Thymol Blue solution in methanol is added as an indicator. Titration is made with 1/10N p-toluenesulfonic acid and a titration amount is measured until yellow color of the solution changes to red color.

Content of end amine group (mmole/kg) =

$$\frac{\text{titration amount for a solution containing sample (cc)} - \text{titration amount for blank (cc)}}{\text{weight of sample}} \times 100 \times \text{(factor)}$$

Polyphenylene ether, epoxy compounds and modified rubber-like materials used in the examples and comparative examples are obtained below. Crystalline thermoplastic resins and epoxy resins for the epoxy compounds which are commercially available are used.

① Polyphenylene Ether

In an autoclave of 10 l in capacity with jacket which is provided with a stirrer, a thermometer, a condenser and an air introducing pipe which reaches the bottom of the autoclave to make a homogeneous solution are charged 3,420 g of xylene, 1,366 g of methanol, 1,222 g (10 mols) of 2,6-dimethylphenol and 24 g (0.6 mol) of sodium hydroxide. Thereafter, to the solution is added a solution prepared by dissolving 31.5 g (0.3 mol) of diethanolamine, 19.4 g (0.15 mol) of di-n-butylamine and 0.99 g (0.005 mol) of manganese chloride tetrahydrate. Then, while vigorously stirring the content, air is blown thereinto at a rate of 5 l/min. Reaction temperature and pressure are maintained at 85° C. and 9 kg/cm$^2$, respectively. The supply of air is stopped after lapse of 7 hours from the beginning of introduction and the reaction mixture is thrown into a mixture of 66 g (1.15 mol) of acetic acid and 4,900 g of methanol. The resulting slurry is filtered under reduced pressure to isolate wet polyphenylene ether. The isolated polyphenylene ether is washed with 7,200 g of methanol and then dried under reduced pressure at 150° C. overnight to obtain 1,179 g of dried polyphenylene ether, which has a reduced viscosity of 0.54 dl/g measured in chloroform of 0.5 g/dl at 25° C.

② Mutual Compatibilizer (i) Maleic Anhydride-Grafted Ethylene/Propylene Rubber One hundred parts by weight of ethylene/propylene rubber is previously mixed with 1.2 part by weight of maleic anhydride and 1.0 part by weight of t-butylperoxy laurate. The mixture is subjected to reaction in an extruder of 30 mφ in screw diameter and L/D=28 at a barrel temperature of 230° C. and at a screw rotation of 60 rpm and modified rubber strand discharged from the die is cooled with water and then pelletized. The product contains 0.7 wt % of grafted maleic anhydride.

Epoxy Compound

Glycidyl methacrylate-ethylene-vinyl acetate copolymer is prepared in accordance with Japanese Patent Publications (Kokai) 47 - 23490 and 48 - 113883. That is, 5.9 kg/hr of glycidyl methacrylate, 300 kg/hr of ethylene, 3.4 kg/hr of vinyl acetate, 30 g/hr of a radical initiator, t-butylperoxy-2-ethylhexanoate, and 1.0 g/hr of propylene as a chain-transfer agent are successively fed in a reactor (40 l) made of stainless steel whose temperature is controlable and which is equipped with an inlet, an outlet and a stirrer and copolymerization is effected under stirring under 1400-1600 atm. at 180°-200° C. The resulting epoxy compound contains 10% by weight of glycidyl methacrylate, 85% by weight of ethylene and 5% by weight of vinyl acetate.

| | | relative viscosity | content of end amine group (mmole/kg) |
|---|---|---|---|
| 3 | Polyamide 6,6 | | |
| | UBE Nylon ® 2015B | 2.4 | 47 |
| | UBE Nylon ® 2020B | 3.0 | 38 |
| | UBE Nylon ® 2026B | 3.4 | |
| | Polyamide 6 UNITIKA Nylon 6 ® | | |
| | A1020BRL | 2.1 | 84 |
| | A1030BRL | 2.6 | 60 |

-continued

| | relative viscosity | content of end amine group (mmole/kg) |
|---|---|---|
| A1030BRT | 3.4 | 42 |

EXAMPLE 1

One hundred parts by weight of a composition comprising 50 wt % of polyamide 6,6 (UBE Nylon ® 2020B) and 50 wt % of polyphenylene ether prepared in the above ① was melt-kneaded with 11.8 parts by weight of maleic anhydride-grafted rubber prepared in the above ② (i) and 5.9 parts by weight of glycidyl methacrylate-ethylene-vinyl acetate copolymer (content of glycidyl methacrylate: 10 wt % of the copolymer) prepared in the above ② (ii) by a twin-screw kneader (PCM 30 ® of Ikegai Tekko Co.).

The resulting composition was injection molded by IS 150E ® of Toshiba Machine Co. at 280° C. to make test specimen for Izod impact test and heat distortion temperature test. The test results are shown in Table 1.

EXAMPLE 2

Example 1 was repeated except that "UBE Nylon ® 2015B" in place of "UBE Nylon ® 2020B" was used as polyamide 6,6. The test results are shown in Table 1.

COMPARATIVE EXAMPLE 1

Example 1 was repeated except that "UBE Nylon ® 2026B" in place of "UBE Nylon ® 2020B" was used as polyamide 6,6. The test results are shown in Table 1.

EXAMPLE 3

One hundred parts by weight of a resin composition comprising 53 wt % of polyamide 6 (UNITIKA Nylon 6 ® A1020BRL) and 47 wt % of polypheylene ether and 11.1 parts by weight of maleic anhydride-grafted rubber were melted and kneaded in a small batchwise twin-screw kneader (LABOPLASTMIL ® of Toyo Seiki Co.) at a barrel temperature of 260° C. and a screw rotation of 90 rpm for 5 minutes.

The resulting composition was pressed at 260° C. to prepare test specimen for Izod impact test and heat distortion temperature test. The test results are shown in Table 2.

EXAMPLE 4

Example 3 was repeated except that "UNITIKA Nylon 6 ® A1030BRL" in place of "UNITICA Nylon 6 ® A1020BRL" was used as polyamide 6. The test results are shown in Table 2.

COMPARATIVE EXAMPLE 2

Example 3 was repeated except that "UNITIKA Nylon 6 ® A1030BRT" in place of "UNITICA Nylon 6 ® A1020BRL" was used as polyamide 6. The results are shown in Table 2.

EXAMPLE 5

Procedure of Example 1 was carried out using 100 parts by weight of a resin composition comprising 50 wt % of polyamide 6,6 (UBE Nylon ® 2020B) and 50 wt % of polyphenylene ether and 42.9 parts by weight of maleic anhydride-grafted rubber (amount of maleic anhydride grafted: 0.7 wt % of rubber) and 5.9 parts by weight of glycidyl methacrylate-ethylene-vinyl acetate copolymer (content of glycidyl methacrylate: 10 wt %). The results are shown in Table 3.

COMPARATIVE EXAMPLE 3

Example 1 was repeated except that the maleic anhydride-grafted rubber was used in an amount of 100 parts by weight. The results are shown in Table 3.

EXAMPLE 6

Example 4 was repeated except that the maleic anhydride-grafted rubber was used in an amount of 25 parts by weight. The results are shown in Table 3.

COMPARATIVE EXAMPLE 4

Example 4 was repeated except that maleic anhydride-grafted rubber was used in an amount of 105 parts by weight. The results are shown in Table 3.

COMPARATIVE EXAMPLE 5

Example 4 was repeated except that the maleic anhydride-grafted rubber was used in an amount of 0.005 part by weight. The results are shown in Table 3.

TABLE 1

| | (A) | | | Amount of (B) per 100 parts by weight of (A) | | M.I. (280° C., 10 kg load) g/10 min. | Izod Impact (23° C., notched) kg · cm/cm | H.D.T. (18.6 kg/cm$^2$) °C. | Rockwell hardness (R scale) |
|---|---|---|---|---|---|---|---|---|---|
| | Polyphenylene ether (b) wt % | Polyamide 6,6 (a) | | Maleic anhydride-grafted rubber Part by weight | Epoxy compound Part by weight | | | | |
| | | wt % | R.V. | C.E.A. | | | | | | |
| Example 1 | 50 | 50 | 3.0 | 38 | 11.8 | 5.9 | 7.0 | 6.5 | 115 | 115 |
| Example 2 | 50 | 50 | 2.4 | 47 | 11.8 | 5.9 | 17.0 | 8.5 | 124 | 115 |
| Comparative Example 1 | 50 | 50 | 3.4 | — | 11.8 | 5.9 | 4.0 | 3.6 | 129 | 114 |

R.V. = Relative viscosity
C.E.A. = Content of end amine group

TABLE 2

| | (A) | | | Amount of (B) per 100 parts by weight of (A) Maleic anhydride-grafted rubber Part by weight | M.I. (280° C., 2.16 kg load) g/10 min. | Izod Impact (23° C., notched) kg · cm/cm | H.D.T. (18.6 kg/cm$^2$) °C. | Rockwell hardness (R scale) |
|---|---|---|---|---|---|---|---|---|
| | Polyphenylene ether (b) wt % | Polyamide 6 (a) | | | | | | |
| | | wt % | R.V. | C.E.A. | | | | | |
| Example 3 | 47 | 53 | 2.1 | 84 | 11.1 | 23 | 9.9 | 86.6 | 108 |
| Example 4 | 47 | 53 | 2.6 | 60 | 11.1 | 15 | 8.6 | 96.9 | 109 |
| Comparative Example 2 | 47 | 53 | 3.4 | 42 | 11.1 | 5.2 | 4.6 | 92.6 | 109 |

R.V. = Relative viscosity
C.E.A. = Content of end amine group

TABLE 3

| | (A) | | | | Amount of (B) per 100 parts by weight of (A) | | M.I. (280° C., 10 kg load) g/10 min. | Izod Impact (23° C. notched) kg · cm/cm | H.D.T. (18.6 kg/cm$^2$) °C. |
|---|---|---|---|---|---|---|---|---|---|
| | Polyphenylene ether (b) wt % | Polyamide (a) | | | Maleic anhydride-grafted rubber Part by weight | Epoxy compound Part by weight | | | |
| | | | R.V. | C.E.A. | | | | | |
| Example 5 | 50 | Polyamide 6,6 50 | 3.0 | 38 | 42.9 | 5.9 | 0.6 | 32.3 | 70.5 |
| Comparative Example 3 | 50 | Polyamide 6,6 50 | 3.0 | 38 | 100 | 5.9 | 3.0 | 15.5 | 40.0 |
| Example 6 | 47 | Polyamide 6 53 | 2.6 | 60 | 25 | — | 7.7 | 15.6 | 65.1 |
| Comparative Example 4 | 47 | Polyamide 6 53 | 2.6 | 60 | 105 | — | 10.3 | 12.1 | 33.5 |
| Comparative Example 5 | 47 | Polyamide 6 53 | 2.6 | 60 | 0.005 | — | 100.5 | 3.3 | 151.0 |

R.V. = Relative viscosity
C.E.A. = Content of end amine group

According to this invention, a composition excellent in processability, impact resistance, etc. which are able to apply to various uses is provided by combination of a polyamide having a specific relative viscosity, a polyphenylene ether and a mutual compatibilizer. The composition are easily processed into shaped articles, sheets, films and the like by molding methods employed for thermoplastic resins such as injection molding, extrusion molding, etc. The processed articles are superior in impact resistance, heat resistance, moldability, etc. The compositions are especially suitable for injection molding.

We claim:

1. A thermoplastic resin composition comprises (A) 100 parts by weight of a composition comprising (a) 5-95% by weight of a polyamide having a relative viscosity of 2.0-3.1 with a terminal amine group content of 35-95 mmole/kg and a ratio of the content of terminal amine group/the content of terminal carboxyl group of 0.37-1.00, and (b) 95-5% by weight of a polyphenylene ether obtained by oxidation polymerization of at least one phenol compound represented by the formula:

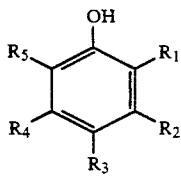

wherein $R_1$, $R_2$, $R_3$, and $R_4$ which may be identical or different and represent a hydrogen atom, a halogen atom or a substituted or unsubstituted hydrocarbon atom, a halogen atom or a substituted or unsubstituted hydrocarbon residue, with a proviso that at least one of them is a hydrogen atom; and (B) 0.01-100 parts by weight of at least one compound selected from the group consisting of compounds containing, in the molecule, at least one of carboxyl group, amino group, imino group, epoxy group, amide group, isocyanate group, alcoholic hydroxyl group, phenolic hydroxyl group, acid anhydrides, and carboxylate.

2. A thermoplastic resin composition according to claim 1 wherein said compound containing an epoxy group is at least one copolymer selected from the group consisting of copolymers of ethylene and an unsaturated epoxy compound and copolymers of an ethylene, an unsaturated epoxy compound and an ethylenically unsaturated compound other than ethylene and an unsaturated epoxy compound.

3. A thermoplastic resin composition which comprises (A) 100 parts by weight of a composition comprising (a) 5-95% by weight of a polyamide having a relative viscosity of 1.6-3.3 an end group content of 35-95 mmole/kg and a ratio of the content of terminal amine group/the content of terminal carboxyl group of 0.37-1.00, and (b) 95-5% by weight of a polyphenylene ether obtained by oxidation polymerization of at least one phenol compound represented by the formula:

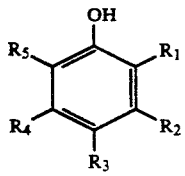

wherein $R_1$, $R_2$, $R_3$, $R_4$ and $R_5$ which may be identical or different and represent a hydrogen atom, a halogen atom or a substituted or unsubstituted hydrocarbon residue, with a proviso that at least one of them is a hydrogen atom and (B) 0.01-100 parts by weight of at least one modified natural or synthetic polymer selected from the group consisting of natural rubber, butadiene homopolymer, butadiene-styrene copolymer, isoprene polymer, chlorobutadiene polymers, butadiene-acrylonitrile copolymer, isobutylene polymer, isobutylene-butadiene copolymer, isobutylene-isoprene copolymer, acrylate ester copolymer, ethylene-propylene copolymer, ethylene-butene copolymer, ethylene-propylene-diencne copolymer, Thiokol rubber, polysulfide rubber, polyurethane rubber, polypropylene oxide rubber, epichlorohydrin rubber, polyester elastomer and polyamide elastomer.

4. A thermoplastic resin composition according to claim 3, further comprising a compound containing an epoxy group.

5. A thermoplastic resin composition according to claim 4, wherein said compound containing an epoxy group is at least one copolymer selected from the group consisting of copolymers of ethylene and an unsaturated epoxy compound and copolymers of an ethylene, an unsaturated epoxy compound and an ethylenically unsaturated compound other than ethylene and an unsaturated epoxy compound.

6. A thermoplastic resin composition according to claim 3 wherein the said polyamide has a relative viscosity of 2.0-3.1.

7. A thermoplastic resin composition which comprises (A) 100 parts by weight of composition comprising (a) 5-95% by weight a polyamide having relative viscosity 2.0-3.1 with a terminal amine group content of 35-95 mmole/kg and a ratio of content of the terminal amine group/the content of terminal carboxyl group of 0.37-1.00, and (b) 95-95% by weight of a polyphenylene ether obtained by oxidation polymerization of at least one phenol compound represented by the formula:

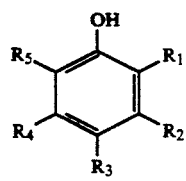

wherein $R_1$, $R_2$, $R_4$ and $R_5$ which may be identical or different and represent a hydrogen atom, a halogen atom or a substituted or unsubstituted hydrocarbon residue, with a proviso that at least one of them is a hydrogen atom; and (B) 0.01-100 parts by weight of a compound containing at least one oxazoline ring.

* * * * *